No. 761,008. PATENTED MAY 24, 1904.
W. F. PEET.
GARMENT HOOK.
APPLICATION FILED DEC. 2, 1903.
NO MODEL.

Witnesses:-
Titus H. Irons.
Frank L. A. Graham.

Inventor;-
Walter F. Peet
by his Attorneys.
Howson & Howson

No. 761,008.

Patented May 24, 1904.

UNITED STATES PATENT OFFICE.

WALTER F. PEET, OF PHILADELPHIA, PENNSYLVANIA, ASSIGNOR OF ONE-HALF TO EDWARD B. PEET, OF PHILADELPHIA, PENNSYLVANIA.

GARMENT-HOOK.

SPECIFICATION forming part of Letters Patent No. 761,008, dated May 24, 1904.

Application filed December 2, 1903. Serial No. 183,515. (No model.)

*To all whom it may concern:*

Be it known that I, WALTER F. PEET, a citizen of the United States, residing in Philadelphia, Pennsylvania, have invented certain Improvements in Garment-Hooks, of which the following is a specification.

The object of my invention is to so construct a garment-hook as to provide for such confinement of the same to the garment as will compel the bend or loop formed between the bill and shank of the hook to lie closely to the surface to which the hook is secured, thereby causing that portion of the garment carrying the hook to fit snugly to the portion carrying the eye and rendering the hook, as well as the eye, invisible when the parts are fastened. This object I attain in the manner hereinafter set forth, reference being had to the accompanying drawings, in which—

Figure 1:
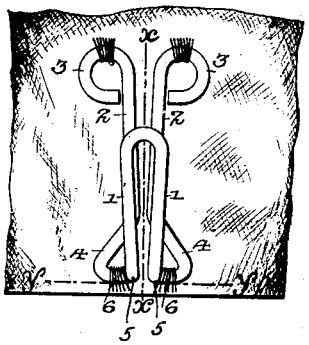
Figure 2:
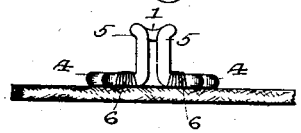
Figure 3:
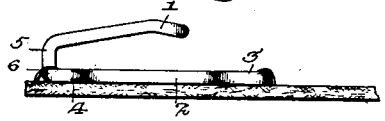
Figure 4:
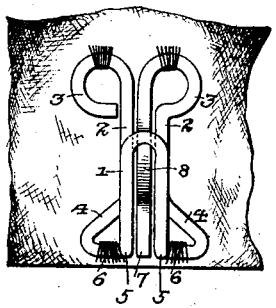
Figure 5:
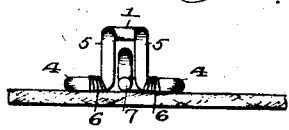

Figure 1 is a face view of a garment-hook constructed in accordance with my invention. Fig. 2 is a front or end view of the same. Fig. 3 is a side view. Fig. 4 is a face view of another form of the hook having a bent and elastic retaining-finger combined therewith. Fig. 5 is an end view of the hook shown in Fig. 4, and Fig. 6 is a side view of the same.

Referring first to Figs. 1, 2, and 3 of the drawings, 1 represents the bill of the hook, and 2 the shank of the same, the bill being bent backwardly over the shank and lying above the same and the shank lying upon the surface of that portion of the garment which is to be secured by the hook. The shank 2 has securing-eyes 3 at its inner end and other securing-eyes 4 at its outer end, and it is to the special form, location, and manner of forming these latter eyes that my invention particularly relates.

The bill 1 of the hook lies in a plane substantially parallel with and above that of the shank 2; but the bend or loop 5 between the bill and shank is substantially at a right angle to these two parts, as shown in Fig. 3, the wire after being carried downwardly from the bill to the plane of the shank 2 being then bent laterally in a plane substantially at a right angle to both the vertical legs of the loop 5 and to the longitudinal plane $x$ of the bill and shank, so as to form the straight front members of the eyes 4, which are in the same transverse plane $y$ as the vertical legs of the loop 5, as shown in Figs. 1 and 2, the wire being bent inwardly at an angle of forty-five degrees, or thereabout, until it reaches the plane of the shank at a point forwardly beyond the inner end of the bill 1, thus forming open forward eyes. By this means a short triangular open eye is formed at each side of the hook, and hence a single wire is presented at this point, so that the stitches 6, whereby the straight front members of these eyes are secured to the garment, will lie close to the angle formed by the loop 5 of the bill of the hook at one end and close to the angle between the straight and inclined parts of the eye at the other end. Hence the stitches cannot slip from these forward members of the eyes 4, and therefore serve to securely and closely confine the extreme forward portion of the loop 5 of the bill of the hook to the garment and prevent such lifting of said loop of the hook as will permit separation of the flap carrying the hook from that carrying the eye. Hence when the two flaps are secured together by the hook and eye both of said securing members are invisible.

Figure 6:
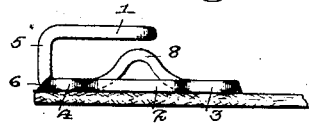

That form of hook shown in Figs. 4, 5, and 6 is, so far as the features constituting my invention are concerned, the same as the hook shown in Figs. 1, 2, and 3, the only difference being the presence between the two members of the shank 2 of a spring-finger 7 with raised portion 8, serving to prevent accidental release of the hook from the eye.

Having thus described my invention, I claim and desire to secure by Letters Patent—

1. A garment-hook having open forward eyes with straight front members which are substantially at a right angle to the loop connecting the bill and shank of the hook, are in the same transverse plane as said loop, and present single wires for the reception of stitches lying close to said angle, substantially as specified.

2. A garment-hook having open forward eyes with straight front members which are substantially at a right angle to the loop connecting the bill of the hook to the shank, and also at a right angle to the longitudinal plane of the bill and shank, are in the same transverse plane as said connecting-loop, and present single wires for receiving stitches which lie close to the loop, substantially as specified.

3. A garment-hook having a shank, a backwardly-projecting bill overlapping the same and forward triangular eyes whose front members are straight and substantially at a right angle to the loop connecting the bill and shank of the hook and whose inclined members join the shank at a point in advance of the end of the bill, substantially as specified.

4. A garment-hook having a shank, a projecting bill overlapping the same, and forward triangular eyes whose front members are straight and at a right angle to the loop connecting the bill of the hook to the shank, and also at a right angle to the longitudinal plane of the bill and shank, and whose inclined members join the shank at a point in advance of the end of the bill, substantially as specified.

5. A garment-hook having a shank, a backwardly-projecting bill overlapping the same, and triangular forward eyes with straight front members which are at a right angle to the loop connecting the bill and shank, and also at a right angle to the longitudinal plane of said bill and shank, and are in the same transverse plane as the loop, and inclined members which join the shank at a point in advance of the end of the bill, substantially as specified.

In testimony whereof I have signed my name to this specification in the presence of two subscribing witnesses.

WALTER F. PEET.

Witnesses:
 HENRY NOAR,
 JOS. H. KLEIN.